(12) United States Patent
Lee et al.

(10) Patent No.: US 8,442,399 B2
(45) Date of Patent: *May 14, 2013

(54) PORT WAVELENGTH RESTRICTION ENCODING IN WAVELENGTH SWITCHED OPTICAL NETWORK

(75) Inventors: Young Lee, Plano, TX (US); Greg Bernstein, Fremont, CA (US); Jianrui Han, Shenzhen (CN)

(73) Assignee: Futurewei Technologies, Inc., Plano, TX (US)

(*) Notice: Subject to any disclaimer, the term of this patent is extended or adjusted under 35 U.S.C. 154(b) by 385 days.

This patent is subject to a terminal disclaimer.

(21) Appl. No.: 12/830,950

(22) Filed: Jul. 6, 2010

(65) Prior Publication Data

US 2011/0008052 A1    Jan. 13, 2011

Related U.S. Application Data (60) Provisional application No. 61/223,918, filed on Jul. 8, 2009.

(51) Int. Cl.
*H04J 14/02*    (2006.01)

(52) U.S. Cl.
USPC ................................. 398/69; 398/89

(58) Field of Classification Search .............. 398/58–64, 398/68–73, 89
See application file for complete search history.

(56) References Cited

U.S. PATENT DOCUMENTS

| | | | |
|---|---|---|---|
| 8,200,084 B2 * | 6/2012 | Bernstein et al. ............... | 398/48 |
| 2007/0140258 A1 | 6/2007 | Tan et al. | |
| 2009/0110395 A1 | 4/2009 | Lee et al. | |
| 2009/0110402 A1 | 4/2009 | Bernstein et al. | |
| 2009/0116836 A1 | 5/2009 | Bernstein et al. | |

OTHER PUBLICATIONS

Bradner, S., "Key Words for Use in RFCs to Indicate Requirement Levels," RFC 2119, Mar. 1997.
McCloghrie, K., et al., "The Interfaces Group MIB," RFC 2863, Jun. 2000.
Berger, L., "Generalized Multi-Protocol Label Switching (GMPLS) Signaling Functional Description," RFC 3471, Jan. 2003.
Kompella, K., et al., "Routing Extensions in Support of Generalized Multi-Protocol Label Switching (GMPLS)," RFC 4202, Oct. 2005.
Kompella, K., et al., "OSPF Extensions in Support of Generalized Multi-Protocol Label Switching (GMPLS)," RFC 4203, Oct. 2005.

(Continued)

*Primary Examiner* — Leslie Pascal
(74) *Attorney, Agent, or Firm* — Conley Rose, P.C.; Grant Randolph; Brandt Howell (57) ABSTRACT

An apparatus comprising a path computation element (PCE) coupled to a path computation client (PCC) and configured to perform a path computation using port wavelength restriction information for a network element (NE), wherein the port wavelength restriction information is encoded and received in a port wavelength restriction Type-Length-Value (TLV) that comprises a matrix identifier (ID), a restriction type, and the port wavelength restriction information. Also disclosed is a network component comprising at least one processor coupled to a memory and configured to receive a port wavelength restriction information TLV that corresponds to a NE, and obtain a restriction type and port wavelength restriction information based on the restriction type from the port wavelength restriction TLV, and use the port wavelength restriction information to calculate a path for the NE.

20 Claims, 6 Drawing Sheets

OTHER PUBLICATIONS

Kompella, K., et al., "IS-IS Extensions in Support of Generalized Multi-Protocol Label Switching (GMPLS)," RFC 5307, Oct. 2008.
Vasseur, J.P., et al., "Path Computation Element (POE) Communication Protocol (PCEP)," RFC 5440, Mar. 2009.
Bernstein, G., et al., "General Network Element Constraint Encoding for GMPLS Controlled Networks," draft-ietf-ccamp-general-constraint-encode-00.txt, Feb. 18, 2010.
Bernstein, G., et al., "General Network Element Constraint Encoding for GMPLS Controlled Networks," draft-ietf-ccamp-general-constraint-encode-01.txt, Mar. 2, 2010.
Bernstein, G., et al., "General Network Element Constraint Encoding for GMPLS Controlled Networks," draft-ietf-ccamp-general-constraint-encode-02.txt, Jun. 9, 2010.
Otani, Tomohiro, et al., "Generalized Labels for G.694 Lambda-Switching Capable Label Switching Routers," draft-ietf-ccamp-gmpls-g-694-lambda-labels-00.txt, May 27, 2008.
Otani, Tomohiro, et al., "Generalized Labels for G.694 Lambda-Switching Capable Label Switching Routers," draft-ietf-ccamp-gmpls-g-694-lambda-labels-01.txt, May 27, 2008.
Otani, Tomohiro, et al., "Generalized Labels for G.694 Lambda-Switching Capable Label Switching Routers," draft-ietf-ccamp-gmpls-g-694-lambda-labels-02.txt, Jul. 14, 2008.
Otani, Tomohiro, et al., "Generalized Labels for G.694 Lambda-Switching Capable Label Switching Routers," draft-ietf-ccamp-gmpls-g-694-lambda-labels-03.txt, Jan. 13, 2009.
Otani, Tomohiro, et al., "Generalized Labels for G.694 Lambda-Switching Capable Label Switching Routers," draft-ietf-ccamp-gmpls-g-694-lambda-labels-04.txt, Mar. 23, 2009.
Otani, Tomohiro, et al., "Generalized Labels for G.694 Lambda-Switching Capable Label Switching Routers," draft-ietf-ccamp-gmpls-g-694-lambda-labels-05.txt, Dec. 7, 2009.
Otani, Tomohiro, et al., "Generalized Labels for G.694 Lambda-Switching Capable Label Switching Routers," draft-ietf-ccamp-gmpls-g-694-lambda-labels-06.txt, Mar. 19, 2010.
Otani, Tomohiro, et al., "Generalized Labels for G.694 Lambda-Switching Capable Label Switching Routers," draft-ietf-ccamp-gmpls-g-694-lambda-labels-07.txt, Apr. 8, 2010.
Bernstein, G., et al., "Framework for GMPLS and PCE Control of Wavelength Switched Optical Networks (WSON)," draft-ietf-ccamp-wavelength-switched-framework-00.txt, May 13, 2008.
Bernstein, G., et al., "Framework for GMPLS and PCE Control of Wavelength Switched Optical Networks (WSON)," draft-ietf-ccamp-wavelength-switched-framework-01.txt, Oct. 31, 2008.
Bernstein, G., et al., "Routing and Wavelength Assignment Information Model for Wavelength Switched Optical Networks," draft-ietf-ccamp-rwa-info-00.txt, Aug. 29, 2008.
Bernstein, G., et al., "Routing and Wavelength Assignment Information Model for Wavelength Switched Optical Networks," draft-ietf-ccamp-rwa-info-01.txt, Nov. 3, 2008.
Lee et al, "Routing and Wavelength Assignment Information Model for Wavelength Switched Optical Networks," draft-ietf-ccamp-rwa-info-02.txt, Mar. 3, 2009.
Lee et al, "Routing and Wavelength Assignment Information Model for Wavelength Switched Optical Networks," draft-ietf-ccamp-rwa-info-03.txt, Jul. 10, 2009.
Lee et al, "Routing and Wavelength Assignment Information Model for Wavelength Switched Optical Networks," draft-ietf-ccamp-rwa-info-04.txt, Sep. 9, 2009.
Lee et al, "Routing and Wavelength Assignment Information Model for Wavelength Switched Optical Networks," draft-ietf-ccamp-rwa-info-05.txt, Oct. 9, 2009.
Lee et al, "Routing and Wavelength Assignment Information Model for Wavelength Switched Optical Networks," draft-ietf-ccamp-rwa-info-06.txt, Feb. 8, 2010.
Lee et al, "Routing and Wavelength Assignment Information Model for Wavelength Switched Optical Networks," draft-ietf-ccamp-rwa-info-07.txt, Feb. 18, 2010.
Bernstein, G., et al., "Routing and Wavelength Assignment Information Encoding for Wavelength Switched Optical Networks," draft-ietf-ccamp-rwa-wson-encode-00.txt, Dec. 18, 2008.
Bernstein, G., et al., "Routing and Wavelength Assignment Information Encoding for Wavelength Switched Optical Networks," draft-ietf-ccamp-rwa-wson-encode-01.txt, Mar. 3, 2009.
Bernstein, G., et al., "Routing and Wavelength Assignment Information Encoding for Wavelength Switched Optical Networks," draft-ietf-ccamp-rwa-wson-encode-02.txt, Jul. 10, 2009.
Bernstein, G., et al., "Routing and Wavelength Assignment Information Encoding for Wavelength Switched Optical Networks," draft-ietf-ccamp-rwa-wson-encode-03.txt, Oct. 8, 2009.
Bernstein, G., et al., "Routing and Wavelength Assignment Information Encoding for Wavelength Switched Optical Networks," draft-ietf-ccamp-rwa-wson-encode-04.txt, Feb. 18, 2010.
"Series G: Transmission Systems and Media, Digital Systems and Networks, Transmission Media Characteristics—Characteristics of Optical Components and Subsystems, Spectral Grids for WDM Applications: DWDM Frequency Grid," ITU-T G.694.1, Jun. 2002, 11 pages.
"Series G: Transmission Systems and Media, Digital Systems and Networks, Transmission Media Characteristics—Characteristics of Optical Components and Subsystems, Spectral Grids for WDM Applications: CWDM Wavelength Grid," ITU-T G.694.2, Dec. 2003, 10 pages.
Bernstein, Greg M., et al., "Modeling WDM Wavelength Switching Systems for use in GMPLS and Automated Path Computafion," Journal of Optical Communications and Networking, Jun. 2009, vol. 1, Issue 1, pp. 187-195.
Foreign Communication From a Related Counterpart Application, International Application No. PCT/CN2010/075061, International Search Report dated Oct. 28, 2010, 3 pages.
Foreign Communication From a Related Counterpart Application, International Application No. PCT/CN2010/075061, Written Opinion dated Oct. 28, 2010, 7 pages.

* cited by examiner

PORT WAVELENGTH RESTRICTION ENCODING IN WAVELENGTH SWITCHED OPTICAL NETWORK

CROSS-REFERENCE TO RELATED APPLICATIONS

The present application claims priority to U.S. Provisional Patent Application Ser. No. 61/223,918 filed Jul. 8, 2009 by Young Lee et al. and entitled "Method of Port Wavelength Restriction Encoding in Wavelength Switched Optical Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bi-directional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks. One of the challenges in implementing WSONs is the determination of the routing and wavelength assignment (RWA) for the various signals that are being transported through the network at any given time. To implement RWA, various NE related information can be forwarded from a Path Computation Client (PCC), such as a NE, and received and processed at a Path Computation Element (PCE). Such RWA information may include port wavelength restriction at the NE.

SUMMARY

In one embodiment, the disclosure includes an apparatus comprising a PCE coupled to a PCC and configured to perform a path computation using port wavelength restriction information for a NE, wherein the port wavelength restriction information is encoded and received in a port wavelength restriction Type-Length-Value (TLV) that comprises a matrix identifier (ID), a restriction type, and the port wavelength restriction information.

In another embodiment, the disclosure includes a network component comprising at least one processor coupled to a memory and configured to receive a port wavelength restriction information TLV that corresponds to a NE, and obtain a restriction type and port wavelength restriction information based on the restriction type from the port wavelength restriction TLV, and use the port wavelength restriction information to calculate a path for the NE.

In yet another embodiment, the disclosure includes a method comprising obtaining port wavelength restriction information for a NE, encoding the port wavelength restriction information in a port wavelength restriction TLV, and forwarding the port wavelength restriction TLV in a message to a PCE.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any quantity of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a WSON, some of the ports at the NEs may have wavelength constraints or restrictions. For example, the NEs may comprise a plurality of ingress ports and/or egress ports that may be configured to send and/or receive different sets of wavelengths along a plurality of paths. A PCE may need to obtain the port wavelength restriction information of the NEs to calculate a plurality of suitable lightpaths between the NEs. The port wavelength restriction information may be forwarded from the NEs or a PCC to the PCE before calculating and establishing the lightpaths between the NEs.

Disclosed herein is a system and method for encoding the port wavelength restriction information of the NEs. The port wavelength restriction information for an NE may be encoded, e.g. by the NE, in a TLV and then sent in a message to the PCE. The PCE may receive and process the TLVs from the NEs to obtain the port wavelength restriction information for the NEs, and hence calculate and establish a plurality of lightpaths between the NEs that support the port wavelength constraints of the NEs. The system and method may be used to encode a plurality of port wavelength restriction types using different TLVs. The port wavelength restriction TLVs may comprise a simple-wavelength restriction TLV, a channel-count restriction TLV, a waveband restriction TLV, and a simple-wavelength and channel-count restriction TLV. The different TLVs may be used to encode the different wavelength restriction information for different types of NEs, such as for optical cross connects (OXCs) and/or reconfigurable optical add/drop multiplexers (ROADMs). The terms "wavelength," "frequency," "label," and "lambda label" may be used herein interchangeably to indicate a signal wavelength or channel in the WSON. More information on the "lambda label" and its use can be found in Otani, et al., *Generalized Labels of Lambda-Switching Capable Label Switching Routers (LSR)*, Internet Engineering Task Force (IETF) Request for Comments (RFC) 3471, draft-otani-ccamp-gmpls-lambda-labels-02.txt, December 2007, which is incorporated herein by reference as if reproduced in its entirety.

Figure 1:
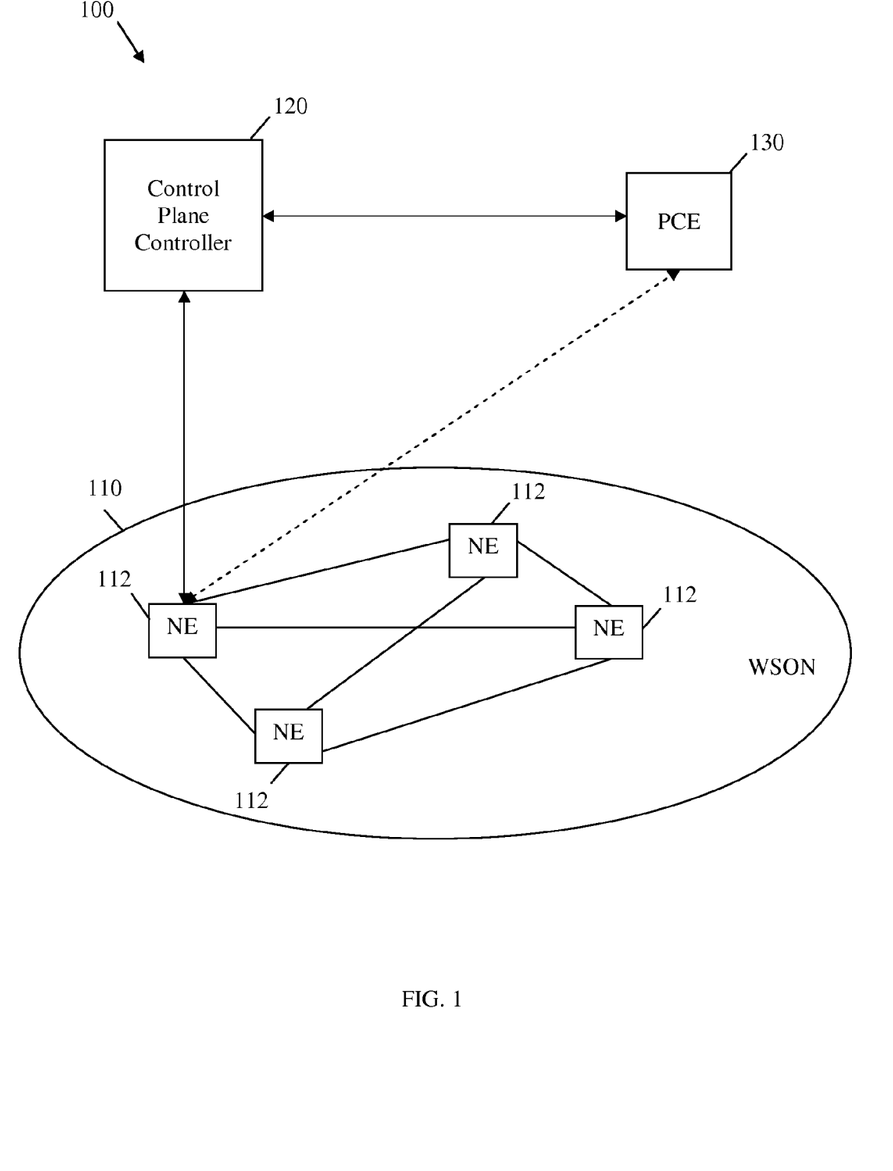
FIG. 1 is a schematic diagram of an embodiment of a WSON system.

FIG. 1 illustrates one embodiment of a WSON system 100. The system 100 may comprise a WSON 110, a control plane controller 120, and a PCE 130. The WSON 110, control plane controller 120, and PCE 130 may communicate with each other via optical, electrical, or wireless means. The WSON 110 may be any optical network that uses active or passive components to transport optical signals. For instance, the WSON 110 may be part of a long haul network, a metropolitan network, or a residential access network. The WSON 110 may implement WDM to transport the optical signals through the WSON 110, and may comprise various optical components including a plurality of NEs 112, which may be coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any quantity of NEs 112.

The NEs 112, also referred to as nodes, may be any devices or components that transport signals through the WSON 110. In an embodiment, the NEs 112 may consist essentially of optical processing components, such as line ports, add ports, drop ports, transmitters, receivers, amplifiers, optical taps, and so forth, and do not contain any electrical processing components. Alternatively, the NEs 112 may comprise a combination of optical processing components and electrical processing components. At least some of the NEs 112 may be configured with WCs, optical-electrical (OE) converters, electrical-optical (EO) converters, OEO converters, or combinations thereof. However, it may be advantageous for at least some of the NEs 112 to lack such converters, as such may reduce the cost and complexity of the WSON 110. In specific embodiments, the NEs 112 may comprise optical switches such as optical cross connects (OXCs), photonic cross connects (PXCs), type I or type II reconfigurable optical add/drop multiplexers (ROADMs), wavelength selective switches (WSSs), fixed optical add/drop multiplexers (FOADMs), or combinations thereof.

Some NEs 112 may be used for wavelength-based switching by forwarding, adding, or dropping any or all of the wavelengths that are used to transmit the optical signals. For instance, the NE 112 may comprise a plurality of ingress ports, such as line side ingress ports or add ports, a plurality of egress ports, such as line side egress ports or drop ports, or combinations thereof. The add ports and drop ports may also be called tributary ports. The optical signals handled by these various ports may comprise one or a plurality of optical wavelengths. The line side ingress ports may receive the optical signals and send some or all of the optical signals to the line side egress ports, which may in turn transmit the optical signals. Alternatively, the line side ingress ports may redirect some or all of the optical signals to the drop ports, which may drop the optical signals, for example, by transmitting the optical signals outside the optical fibers. The add port may receive additional optical signals and send the optical signals to some of the line side egress ports, which may in turn transmit the optical signals.

In some instances, the NE 112 may comprise at least one colored port that may be an ingress port or an egress port, which may receive or transmit, respectively, the optical signal at a fixed optical wavelength or a limited range of optical wavelengths. Additionally or alternatively, the NE may comprise at least one colorless port that may be an ingress port or an egress port, which may receive or transmit, respectively, the optical signal at any one of a plurality of different wavelengths. The NE 112 that comprises a colorless port and supports any or a plurality of variable wavelengths may be referred to as a colorless NE. Alternatively, the NE 112 that does not comprise a colorless port and supports one or a plurality of predetermined (or specified) wavelengths may be referred to as a colored NE. Further, the NE 112 may comprise one or a plurality of WCs that may convert one or a plurality of wavelengths between at least one ingress port and one egress port. For instance, a WC may be positioned between an ingress port and an egress port and may be configured to convert a first wavelength received at the ingress port into a second wavelength, which may then be transmitted at the egress port. The WC may comprise any quantity of optical and/or electrical components that may be configured for wavelength conversion, such as an OEO converter and/or a laser.

The NEs 112 may be coupled to each other via optical fibers, also referred to as links. The optical fibers may be used to establish optical links and transport the optical signals between the NEs 112. The optical fibers may comprise standard single mode fibers (SMFs) as defined in International Telecommunication Union (ITU) Telecommunication Standardization Sector (ITU-T) standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference.

The control plane controller 120 may coordinate activities within the WSON 110. Specifically, the control plane controller 120 may receive optical connection requests and provide lightpath signaling to the WSON 110 via an Interior Gateway Protocol (IGP) such as Generalized Multi-Protocol Label Switching (GMPLS), thereby coordinating the NEs 112 such that data signals are routed through the WSON 110 with little or no contention. In addition, the control plane controller 120 may communicate with the PCE 130 using PCE protocol (PCEP) to provide the PCE 130 with information that may be used for the RWA, receive the RWA from the PCE 130, and/or forward the RWA to the NEs 112. The control plane controller 120 may be located in a component outside of the WSON 110, such as an external server, or may be located in a component within the WSON 110, such as a NE 112.

The PCE 130 may perform all or part of the RWA for the WSON system 100. Specifically, the PCE 130 may receive wavelength and/or other information that may be used for the RWA from the control plane controller 120, from the WSON 110, or both. The wavelength information may comprise port wavelength restrictions for the NE 112, such as for a colored NE that comprises a colored port. The PCE 130 may process the information to obtain the RWA, for example, by computing the routes, e.g. lightpaths, for the optical signals, specifying the optical wavelengths that are used for each lightpath, and determining the NEs 112 along the lightpath at which the optical signal should be converted to an electrical signal or a different wavelength. The RWA data may include at least one route for each incoming signal and at least one wavelength associated with each route. The PCE 130 may then send all or part of the RWA data to the control plane controller 120 or directly to the NEs 112. To assist the PCE 130 in this process, the PCE 130 may comprise a global traffic-engineering database (TED), a RWA information database, an optical performance monitor (OPM), a physical layer constraint (PLC) information database, or combinations thereof. The PCE 130 may be located in a component outside of the WSON 110, such as an external server, or may be located in a component within the WSON 110, such as a NE 112.

In some embodiments, the RWA information may be sent to the PCE 130 by a PCC. The PCC may be any client application requesting a path computation to be performed by the PCE 130. The PCC may also be any network component that makes such a request, such as the control plane controller 120, or any NE 112, such as a ROADM or a FOADM.

Figure 2:
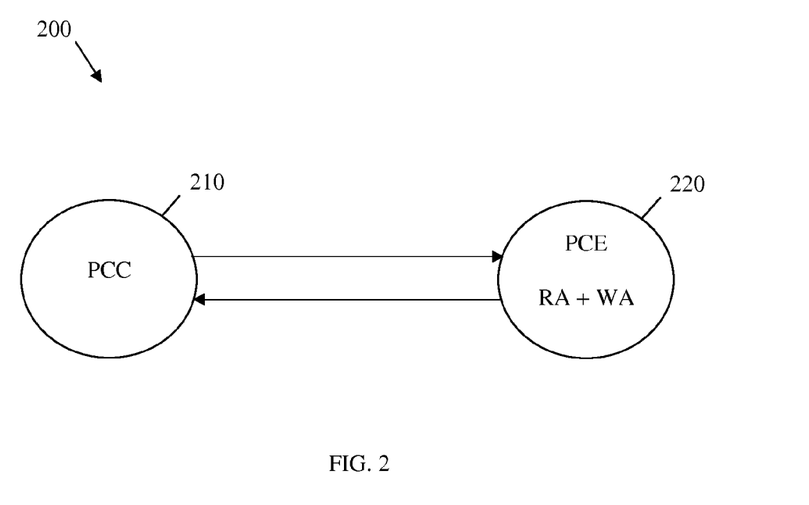
FIG. 2 is a schematic diagram of an embodiment of a combined RWA architecture.

FIG. 2 illustrates an embodiment of a combined RWA architecture 200. In the combined RWA architecture 200, the PCC 210 communicates the RWA request and the required information to the PCE 220, which implements both the routing assignment and the wavelength assignment functions using a single computation entity, such as a processor. For example, the processor may process the RWA information using a single or multiple algorithms to compute the lightpaths as well as to assign the optical wavelengths for each lightpath. The amount of RWA information needed by the PCE 220 to compute the RWA may vary depending on the algorithm used. If desired, the PCE 220 may not compute the RWA until sufficient network links are established between the NEs or when sufficient RWA information regarding the NEs and the network topology is provided. The combined RWA architecture 200 may be preferable for network optimization, smaller WSONs, or both.

Figure 3:
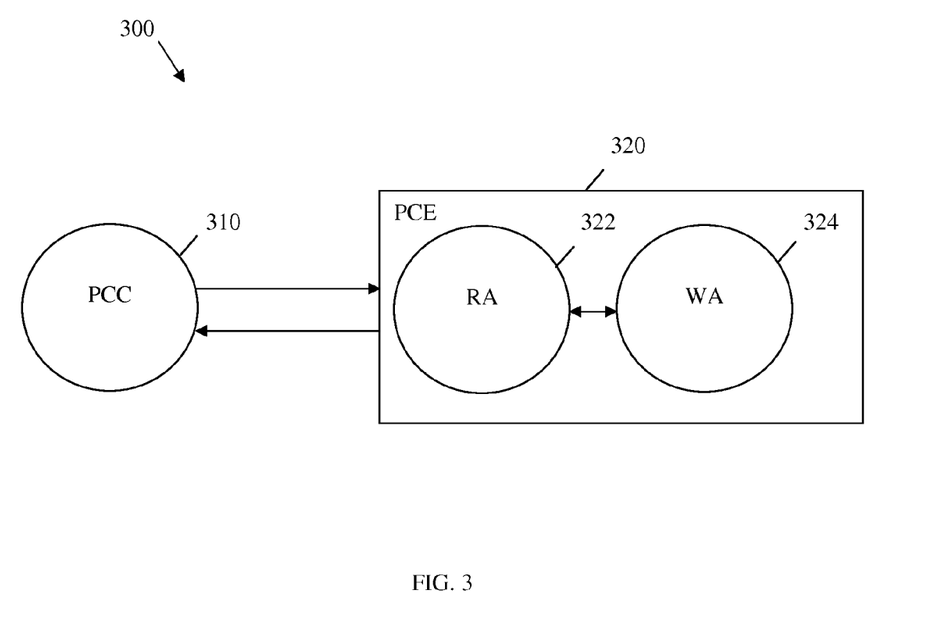
FIG. 3 is a schematic diagram of an embodiment of a separated RWA architecture.

FIG. 3 illustrates an embodiment of a separated RWA architecture 300. In the separated RWA architecture 300, the PCC 310 communicates the RWA request and the required information to the PCE 320, which implements both the routing function and the wavelength assignment function using separate computation entities, such as processors 322 and 324. Alternatively, the separated RWA architecture 300 may comprise two separate PCEs 320 each comprising one of the processors 322 and 324. Implementing routing assignment and wavelength assignment separately may offload some of the computational burden on the processors 322 and 324 and reduce the processing time. In an embodiment, the PCC 310 may be aware of the presence of only one of two processors 322, 324 (or two PCEs) and may only communicate with that processor 322, 324 (or PCE). For example, the PCC 310 may send the RWA information to the processor 322, which may compute the lightpath routes and forward the routing assignment to the processor 324 where the wavelength assignments are performed. The RWA may then be passed back to the processor 322 and then to the PCC 310. Such an embodiment may also be reversed such that the PCC 310 communicates with the processor 324 instead of the processor 322.

In either architecture 200 or 300, the PCC 210 or 310 may receive a route from the source to destination along with the wavelengths, e.g. GMPLS labels, to be used along portions of the path. The GMPLS signaling supports an explicit route object (ERO). Within an ERO, an ERO label sub-object can be used to indicate the wavelength to be used at a particular NE. In cases where the local label map approach is used, the label sub-object entry in the ERO may have to be translated.

Figure 4:
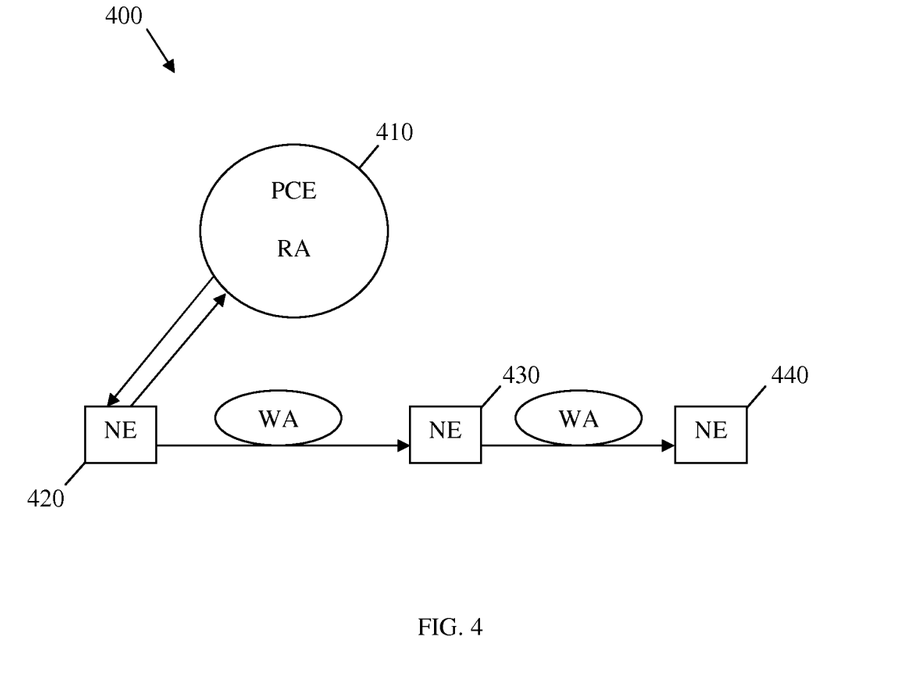
FIG. 4 is a schematic diagram of an embodiment of a distributed wavelength assignment architecture.

FIG. 4 illustrates a distributed wavelength assignment architecture 400. In the distributed wavelength assignment architecture 400, the PCE 410 may receive some or all of the RWA information from the NEs 420, 430, and 440, perhaps via direct link, and implements the routing assignment. The PCE 410 then directly or indirectly passes the routing assignment to the individual NEs 420, 430, and 440, which assign the wavelengths at the local links between the NEs 420, 430, and 440 based on local information. Specifically, the NE 420 may receive local RWA information from the NEs 430 and 440 and send some or all of the RWA information to the PCE 410. The PCE 410 may compute the lightpaths using the received RWA information and send the list of lightpaths to the NE 420. The NE 420 may use the list of lightpaths to identify the NE 430 as the next NE in the lightpath. The NE 420 may establish a link to the NE 430 and use the received local RWA information that may comprise additional constraints to assign a wavelength for transmission over the link. The NE 430 may receive the list of lightpaths from the NE 420, use the list of lightpaths to identify the NE 440 as the next NE in the lightpath, establish a link to the NE 440, and assign the same or a different wavelength for transmission over the link. Thus, the signals may be routed and the wavelengths may be assigned in a distributed manner between the remaining NEs in the network. Assigning the wavelengths at the individual NEs may reduce the amount of RWA information that has to be sent to the PCE 410.

Figure 5:
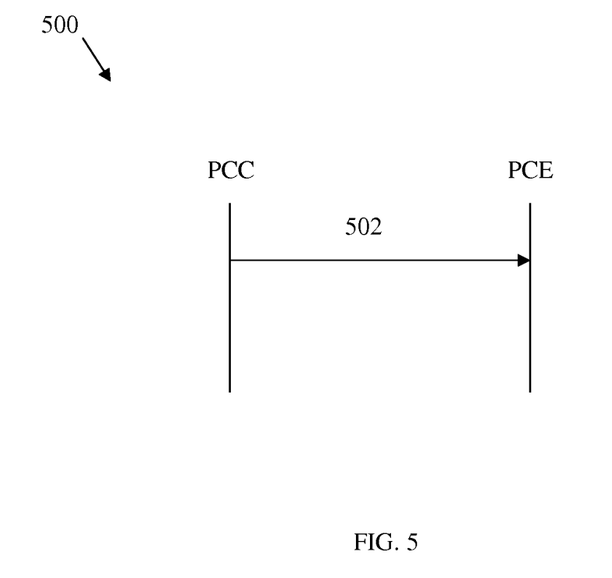
FIG. 5 is a protocol diagram of an embodiment of a PCC and PCE communication method.

FIG. 5 illustrates an embodiment of a communication method 500 between the PCC and the PCE. In the method 500, the PCC sends a message 502 to the PCE, where the message 502 comprises at least some of the RWA information described below. The message 502 may also contain a status indicator that indicates whether the RWA information is static or dynamic. In an embodiment, the status indicator may indicate how long the static or dynamic status lasts so that the PCE can know how long the RWA information is valid and/or when to expect an update. Additionally or alternatively, the message 502 may contain a type indicator that indicates whether the RWA information is associated with a node, a link, or both. In some instances, an acknowledgement message that confirms receipt of the message 502 may be sent from the PCE to the PCC, e.g. subsequent to receipt of the message 502.

The method 500 may be implemented using any suitable protocol, such as the IGP. The IGP may be a routing protocol used for exchanging route information among gateways, such as a host computer or routers, in an autonomous network. Internet networks can be divided into multiple domains or multiple autonomous systems, where one domain congregates a batch of host computers and routers that employ the same routing protocol. In such a case, the IGP may be provided for selecting routes in a domain. The IGP may be link-state routing protocol in that each node possesses information regarding the complete network topology. In such a case, each node can independently calculate the best next hop from it for every possible destination in the network using local information of the topology. The collection of best next hops may form the routing table for the node. In a link-state protocol, the only information that may be passed between the nodes is information used to construct the connectivity maps. Examples of suitable IGPs include GMPLS, open shortest path first (OSPF), and intermediate system to intermediate system (IS-IS).

As mentioned above, the message 502 may comprise RWA information, such as at least one port restriction. The port restrictions may indicate limitations regarding the wavelengths supported by the NE's ports, the connectivity of the NE's ports, or both. For instance, the port restrictions may comprise port wavelength restriction information or data, port connectivity information or data, and/or WC pool connectivity information or data. In some embodiments, the port wavelength restriction data, port connectivity data, and/or WC pool connectivity data corresponding to a plurality of ports may be forwarded for each port individually from the PCC to the PCE. Alternatively, the port wavelength restriction information, port connectivity information, and/or WC pool connectivity information for a plurality of ports may be combined together and then forwarded to the PCE.

Further, the port wavelength restriction information may vary for different types of NEs 112. For example, the NEs 112 may comprise OXCs, PXCs, ROADMs, FOADMs, and/or WSSs that may support different individual wavelengths, wavelength channels, tunable wavelength bands, and/or combinations thereof. In an embodiment, the port wavelength restriction information may be encoded and obtained using a plurality of different TLVs that may indicate the different port wavelength restriction types, as described in detail below.

Figure 6:
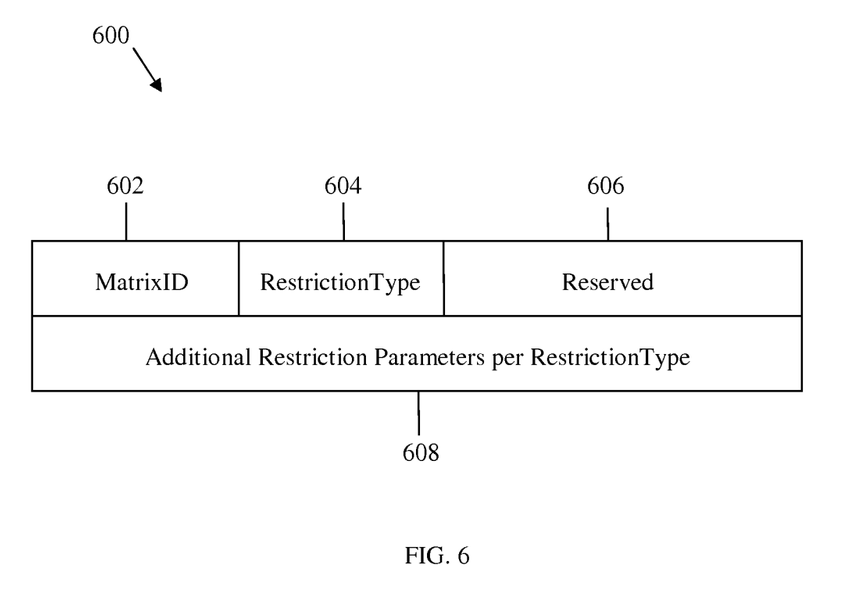
FIG. 6 is a schematic diagram of an embodiment of a port wavelength restriction Type-Length-Value.

FIG. 6 illustrates one embodiment of a port wavelength restriction TLV 600, which may be used, e.g. in the message 502, to communicate the port wavelength restriction information for the NEs. The PCC may send in the same message to the PCE one or a plurality of port wavelength restriction TLVs 600 that may indicate different port wavelength restriction types, such as for NEs that have complex port wavelength constraints. The port wavelength restriction TLV 600 may comprise a matrix ID field 602, a restriction type field 604, a reserved field 606, and optionally at least one information field 608. In an embodiment, the matrix ID field 602 may comprise about eight bits, the restriction type field 604 may comprise about 10 bits, the reserved field 606 may comprise about 14 bits, and the information field(s) 608 may comprise a plurality of bits, which may depend on the amount of wavelength restriction information included.

The matrix ID field 602 (e.g. MatrixID) may comprise the same ID value used in a connectivity matrix TLV that corresponds to the same NE as the port wavelength restriction TLV 600. As such, the ID value may be used to associate the port wavelength restriction information in the port wavelength restriction TLV 600 to the port connectivity information in the connectivity matrix TLV. Alternatively, the ID value in the matrix ID field 602 may be set to about 0xFF to indicate that the port wavelength restriction information corresponds to a port of the NE independent of any port connectivity information of the NE.

The restriction type field 604 (e.g. RestrictionType) may comprise a type value that indicates the port wavelength restriction type, which may be based on the type of the corresponding NE. The type value may be set to about zero to indicate a simple-wavelength restriction type that may define a set of individual wavelengths that may be supported by the port, or to about one to indicate a channel-count restriction type that may define a number of wavelength channels that may be supported by the port. Alternatively, the type value may be set to about two to indicate a waveband restriction type that may define a tunable wavelength band for the port, or to about three to indicate a combined simple-channel and channel-count restriction type.

The reserved field 606 (e.g. Reserved) may be reserved for other purposes and/or may not be used. The information field 608 may comprise the port wavelength restriction information. The information may indicate a set of individual wavelengths for the port if the restriction type field 604 comprises about zero, a number of wavelength channels for the port if the restriction type field 604 comprises about one, a tunable wavelength band for the port if the restriction type field 604 comprises about two, or a combination of individual wavelengths and a number of wavelength channels if the restriction type field 604 comprises about three. Based on the type value in the restriction type field 604 and the corresponding port wavelength restriction information in the information field 608, the port wavelength restriction TLV 600 may correspond to any of the TLV types described below.

Figure 7:
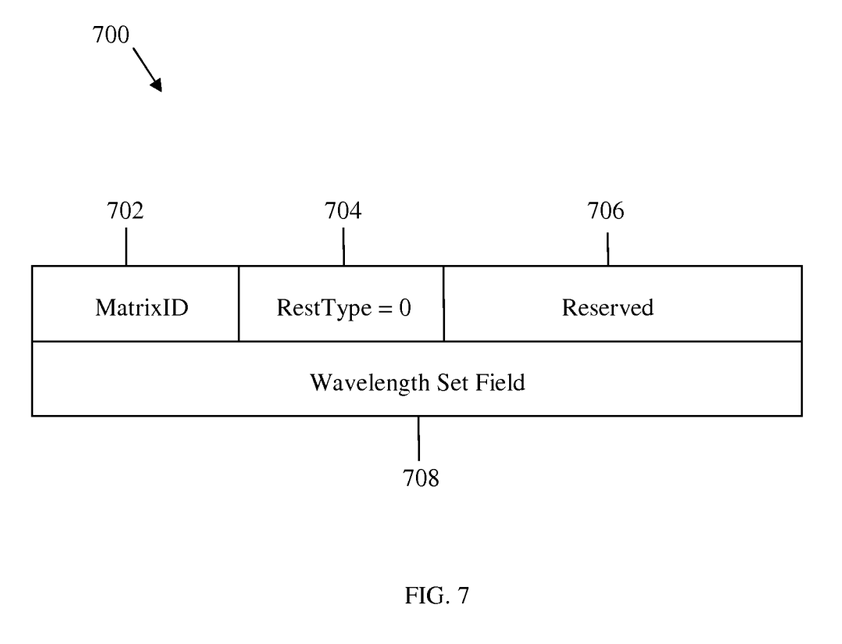
FIG. 7 is a schematic diagram of an embodiment of a simple-wavelength restriction Type-Length-Value.

FIG. 7 illustrates one embodiment of a simple-wavelength restriction TLV 700, which may be used to communicate at least one individual wavelength that may be supported by a port of the NE. The simple-wavelength restriction TLV 700 may comprise a matrix ID field 702 (e.g. MatrixID), a restriction type field 704 (e.g. RestType), a reserved field 606, and a wavelength set field 608, which may be configured similar to the corresponding fields of the port wavelength restriction TLV 600. Specifically, the restriction type field 704 may comprise a type value that may be set to about zero to indicate the type of the simple-wavelength restriction TLV 700. Accordingly, the wavelength set field 708 may comprise at least one individual wavelength that may be supported by the port. For example, the wavelength set field 708 may comprise the values of all or at least some of the wavelengths that may be supported by the port.

Figure 8:
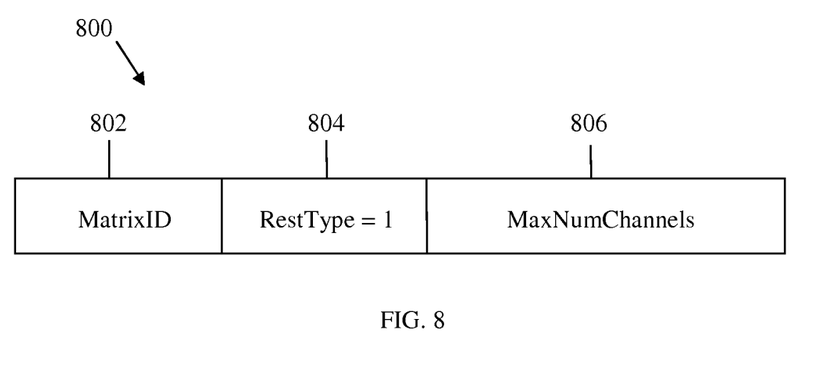
FIG. 8 is a schematic diagram of an embodiment of a channel-count restriction Type-Length-Value.

FIG. 8 illustrates one embodiment of a channel-count restriction TLV 800, which may be used to communicate a quantity or number of wavelength channels that may be supported by a port of the NE. The channel-count restriction TLV 800 may comprise a matrix ID field 802 (e.g. MatrixID), a restriction type field 804 (e.g. RestType), and a maximum number of channels field 806 (e.g. MaxNumChannels), which may be configured similar to the corresponding fields of the port wavelength restriction TLV 600. Specifically, the restriction type field 804 may comprise a type value that may be set to about one to indicate the type of the channel-count restriction TLV 800. Accordingly, the maximum number of channels field 808 may indicate the quantity of wavelength channels that may be supported by the port. For example, the maximum number of channels field 808 may indicate a maximum number of wavelength channels that may be simultaneously supported by the port.

Figure 9:
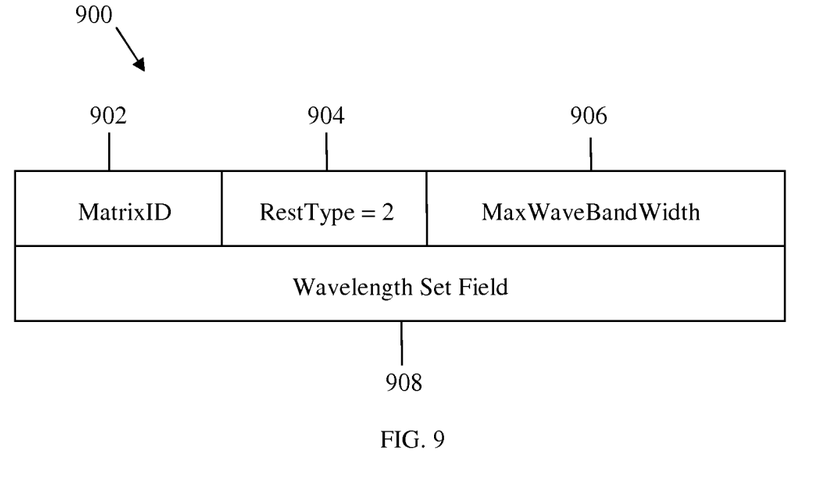
FIG. 9 is a schematic diagram of an embodiment of a waveband restriction Type-Length-Value.

FIG. 9 illustrates one embodiment of a waveband restriction TLV 900, which may be used to communicate a tunable wavelength band that may be supported by a port of the NE. The waveband restriction TLV 900 may comprise a matrix ID field 902 (e.g. MatrixID), a restriction type field 904 (e.g. RestType), a maximum waveband width field 906 (e.g. MaxWaveBandWidth), and a wavelength set field 908, which may be configured similar to the corresponding fields of the port wavelength restriction TLV 600. Specifically, the restriction type field 904 may comprise a type value that may be set to about two to indicate the type of the waveband restriction TLV 900. Accordingly, the maximum waveband width field 906 may indicate a width of a waveband, e.g. in terms of channel spacing, for the wavelengths indicated in the wavelength set fields 908. The wavelength set field 908 may indicate a tuning range for the port. For example, the maximum waveband width field 906 may indicate a maximum width of the tunable waveband and the wavelength set field 908 may indicate all the wavelengths in the tuning range. Additionally, information about the center wavelength of the tunable waveband may be obtained, e.g. by the PCE, from dynamic channel or label in use information.

Figure 10:
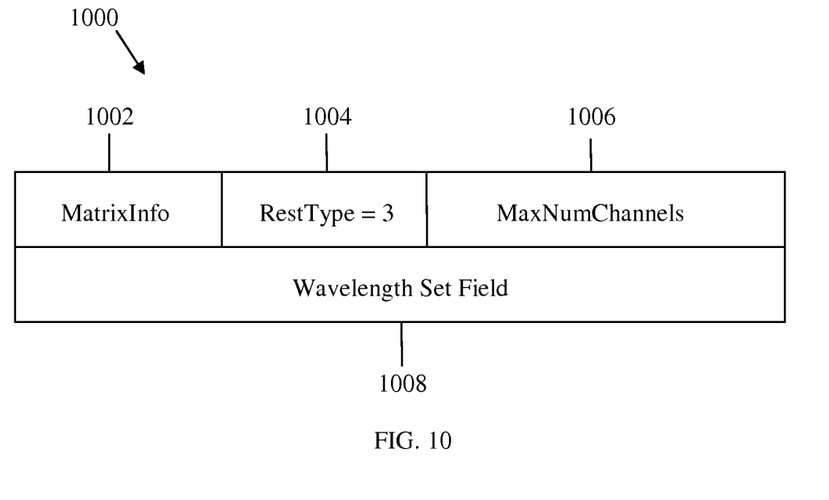
FIG. 10 is a schematic diagram of an embodiment of a simple-wavelength and channel-count restriction Type-Length-Value.

FIG. 10 illustrates one embodiment of a simple-wavelength and channel count restriction TLV 1000, which may be used to communicate a combination of at least one individual wavelength and a quantity of wavelength channels that may be supported by a port of the NE. The simple-wavelength and channel-count restriction TLV 1000 may comprise a matrix ID field 1002 (e.g. MatrixInfo), a restriction type field 1004 (e.g. RestType), a maximum number of channels field 1006 (e.g. MaxNumChannels), and a wavelength set field 1008, which may be configured similar to the corresponding fields of the port wavelength restriction TLV 600.

Specifically, the restriction type field 1004 may comprise a type value that may be set to about three to indicate the type of the simple-wavelength and channel-count restriction TLV 1000. Accordingly, the wavelength set field 1008 may indicate at least one individual wavelength and the maximum number of channels field 1006 may indicate the quantity of wavelength channels that may be supported by the port.

Figure 11:
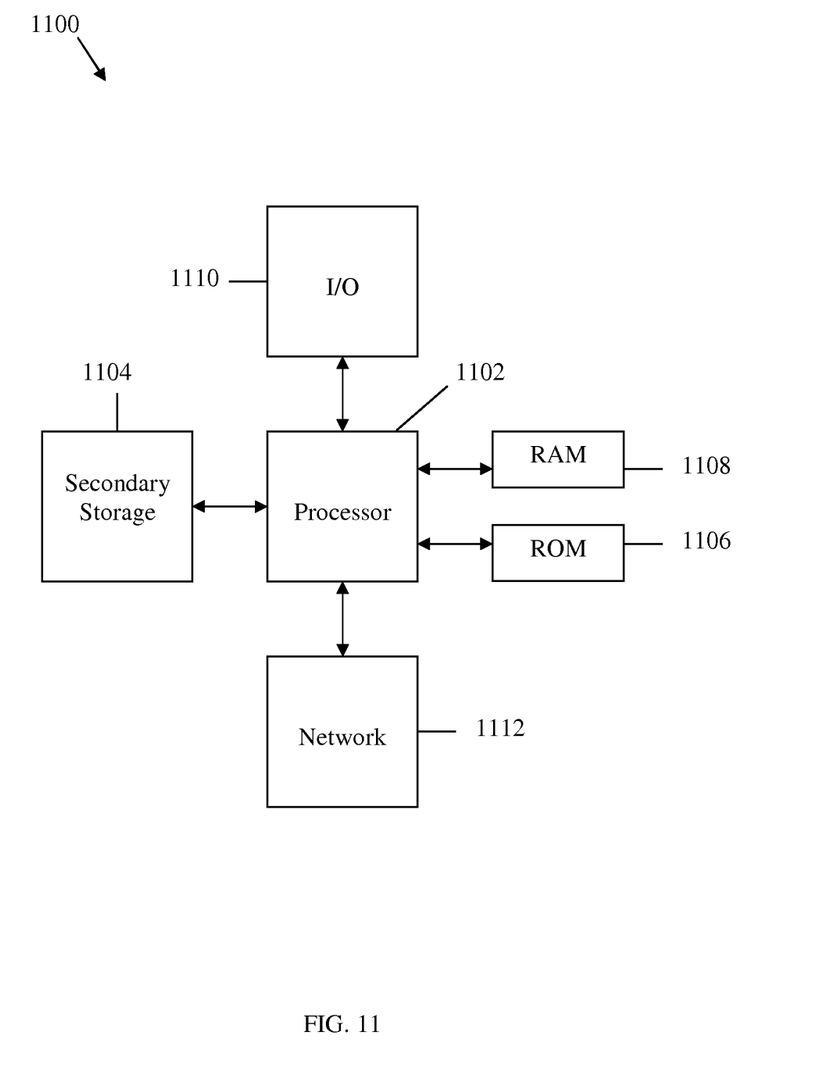
FIG. 11 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 11 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage. The RAM 1108 is used to store volatile data and perhaps to store instructions. Access to both ROM 1106 and RAM 1108 is typically faster than to secondary storage 1104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a path computation element (PCE) coupled to a path computation client (PCC) and configured to perform a path computation using port wavelength restriction information for a network element (NE),
wherein the port wavelength restriction information is encoded and received in a port wavelength restriction Type-Length-Value (TLV) that comprises a matrix identifier (ID), a restriction type, and the port wavelength restriction information.

2. The apparatus of claim 1, wherein the matrix ID comprises the same ID value in a connectivity matrix TLV that corresponds to the same NE.

3. The apparatus of claim 1, wherein the matrix ID is set to about 0xFF to indicate that the port wavelength restriction information corresponds to a port of the NE independent of other port connectivity information of the NE.

4. The apparatus of claim 1, wherein the port wavelength restriction TLV is a simple-wavelength restriction TLV that comprises a wavelength set, wherein the restriction type is set to about zero, and wherein the wavelength set indicates a set of individual wavelengths that are supported by a port of the NE.

5. The apparatus of claim 1, wherein the port wavelength restriction TLV is a channel-count restriction TLV that comprises a maximum number of channels, wherein the restriction type is set to about one, and wherein the maximum number of channels indicates a quantity of wavelength channels that are supported by a port of the NE.

6. The apparatus of claim 1, wherein the port wavelength restriction TLV is a waveband restriction TLV that comprises a maximum waveband width and a wavelength set, wherein the restriction type is set to about two, wherein the maximum waveband width indicates a width of a tunable waveband of wavelengths that is supported by a port of the NE, and wherein the wavelength set indicates a plurality of wavelengths in the tunable waveband that are supported by the port.

7. The apparatus of claim 1, wherein the port wavelength restriction TLV is a wavelength set and channel-count restriction TLV that comprises a maximum number of channels and a wavelength set, wherein the restriction type is set to about three, wherein the maximum number of channels indicates a quantity of wavelength channels that are supported by a port of the NE, and wherein the wavelength set indicates a set of individual wavelengths that are supported by the port.

8. The apparatus of claim 1, wherein the NE is an optical cross connect (OXC) that comprises a colored port that receives, transmits, or both an optical signal at a fixed wavelength, a limited wavelength range, or both.

9. The apparatus of claim 1, wherein the NE is a reconfigurable optical add/drop multiplexer (ROADM) that comprises a colored port that receives, transmits, or both an optical signal at a fixed wavelength, a limited wavelength range, or both.

10. A network component comprising:
at least one processor coupled to a memory and configured to:
receive a port wavelength restriction information Type-Length-Value (TLV) that corresponds to a network element (NE); and
obtain a restriction type and port wavelength restriction information based on the restriction type from the port wavelength restriction TLV; and
use the port wavelength restriction information to calculate a path for the NE.

11. The network component of claim 10, wherein the restriction type indicates a simple-wavelength restriction type, and wherein the port wavelength restriction information indicates a set of individual wavelengths that are supported by a port of the NE.

12. The network component of claim 10, wherein the restriction type indicates a channel-count restriction type, and wherein the port wavelength restriction information indicates a quantity of wavelength channels that are supported by a port of the NE.

13. The network component of claim 10, wherein the restriction type indicates a waveband restriction type, and wherein the port wavelength restriction information indicates a width of a tunable waveband of wavelengths and a plurality of wavelengths in the tunable waveband that are supported by the port.

14. The network component of claim 10, wherein the restriction type indicates a simple-wavelength and channel-count restriction type, and wherein the port wavelength restriction information indicates a set of individual wavelengths and a quantity of wavelength channels that are supported by the port.

15. The network component of claim 10, wherein the path is calculated using the port wavelength restriction information based on a distributed wavelength assignment architecture.

16. A method comprising:
obtaining port wavelength restriction information for a network element (NE);
encoding the port wavelength restriction information in a port wavelength restriction Type-Length-Value (TLV); and
forwarding the port wavelength restriction TLV in a message to a path computation element (PCE).

17. The method of claim 16, wherein the port wavelength restriction TLV comprises a matrix identifier (ID) field, a restriction type field, one of a reserved field, a maximum number of channels field, or a maximum waveband width field, and an information field.

18. The method of claim 17, wherein the matrix ID field comprises about eight bits, the restriction type field comprises about 10 bits, and the reserved field, the maximum number of channels field, or the maximum waveband width field comprises about 14 bits.

19. The method of claim 17, wherein the matrix ID field indicates the port of the NE, the restriction type indicates one of a simple-wavelength restriction type, a channel-count restriction type, a waveband restriction type, or a simple-wavelength and channel-count restriction type.

20. The method of claim 17, wherein the information field is a wavelength set field.

* * * * *

UNITED STATES PATENT AND TRADEMARK OFFICE
CERTIFICATE OF CORRECTION

PATENT NO.       : 8,442,399 B2  
APPLICATION NO.  : 12/830950  
DATED            : May 14, 2013  
INVENTOR(S)      : Young Lee, Greg Bernstein and Jianrui Han It is certified that error appears in the above-identified patent and that said Letters Patent is hereby corrected as shown below:

On the Title Page, Item (74) Attorney, Agent or Firm -
delete "Grant Randolph;" and insert -- Grant Rodolph; --.

Signed and Sealed this
Second Day of July, 2013

Teresa Stanek Rea
*Acting Director of the United States Patent and Trademark Office*